United States Patent Office 3,414,596
Patented Dec. 3, 1968

3,414,596
BISCYCLOPENTADIENYL-METAL CARBORANE POLYESTERS
Marvin M. Fein, Westfield, and Nathan Mayes, Ironia, N.J., assignors to Thiokol Chemical Corporation, Bristol, Pa., a corporation of Delaware
No Drawing. Filed June 29, 1965, Ser. No. 468,161
39 Claims. (Cl. 260—429)

ABSTRACT OF THE DISCLOSURE

Novel biscyclopentadienyl-metal carborane polyesters having recurring units of the formula

wherein A is the radical of a carborane isomer, D is a disubstituted cyclopentadienyl radical and M is iron, ruthenium or osmium radical, are prepared by reaction a carboranyl (A) diol with a metallocene of iron, ruthenium or osmium of the formula:

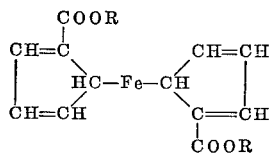

wherein R is selected from the group consisting of hydrogen and alkyl radicals having from 1 to 4 carbon atoms.

The compounds have utility as additives to ultraviolet-resistant coatings.

---

This invention concerns boron containing esters and their preparation.

More particularly, this invention relates to esters and polyesters prepared by the reaction of hydroxylated carboranes such as carborane alcohols and carborane diols with metallocenes such as biscyclopentadienyl metallics having at least one COOR group wherein R is selected from the group consisting of hydrogen and alkyl radical having 1 to 4 carbon atoms. These esters are valuable for preparing carborane polymers and in some instances are valuable as ultraviolet resistant coatings. The esters are valuable as additives to UV resistant coatings.

The term "carborane alcohols" and "carborane diols" as used throughout this application is used to describe compounds containing at least one carborane group, one or more reactive hydroxy sites, as well as groups inert to the reaction. These include alkyl groups and ether groups. Illustrative of these are the mono- and bis-hydroxy-alkyl carboranes and the hydroxy-alkyl carborane ethers.

Carborane (which is abbreviated as A throughout this application) is the generic term used to describe all the isomers of the dicarbaclovododecaborane of the empirical formula: $B_{10}C_2H_{12}$.

The term "carboranyl" is the name given to the radical of the ortho carborane isomer shown below:

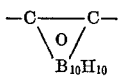

The ortho isomer is also referred to by the Greek letter Theta, abbreviated as Θ.

The radical of the para-isomer of carborane is referred to herein as paracarboranyl and is abbreviated as P.

The radical of the meta isomer of carborane is referred to as "neocarboranyl," abbreviated as ⊕.

The term "metal biscyclopentadienyls" as used throughout this application refers to the dicarboxy or diester derivatives of the compounds abbreviated as

The disubstituted cyclopentadienyl radical —$C_5H_4$— is abbreviated by the capital letter D.

These compounds are included within the structural formula:

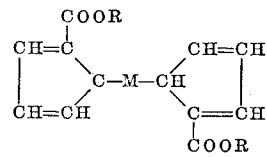

wherein R is selected from the group consisting of hydrogen and alkyl and M is a metal selected from the group consisting of iron, ruthenium and osmium.

It is an object of this invention to prepare novel carborane esters.

It is an additional object of this invention to prepare compositions useful as coatings resistant to ultraviolet attack.

A further object of this invention is to prepare novel polyesters containing both carborane groups and metalloorganic groups incorporated within the molecule.

The other objects of this invention will become apparent after a further perusal of this application.

The above objects among others are achieved through the preparation of the esters of this invention.

In practice, a carborane reactant selected from the group of carborane alcohols or carborane diols is contacted with biscyclopentadienyl metallo-organic as previously defined under the usual conditions of esterification, namely, elevated temperatures and dehydration catalysts until a novel ester product is formed. The first of the 3 reactions shown below is illustrative of the reaction products obtained when a carborane diol is the reactant, while the second reaction shows the products obtained when a carborane alcohol is reacted on an equi-molar basis with the acidic biscyclopentadienyl reactant. The third reaction shows the products obtained when 2 or more moles of the carborane alcohol is reacted with one mole of the biscyclopentadienyl reactant.

(1) 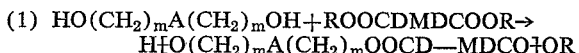

(2) 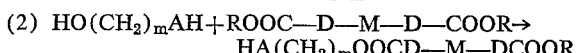

(3) 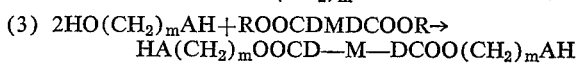

wherein M is a metal selected from the group consisting of iron, ruthenium and osmium, D is the disubstituted cyclopentadienyl radical —$C_5H_4$—, A is the afore-described generic term for the carboranes, and R is selected from the group consisting of hydrogen and alkyl.

As the preceding description indicates, considerable variation is possible insofar as the choice of carborane reactant and the cyclopentadienyl type reactant is concerned.

For example, any of the following illustrative carborane alcohols or carborane diols can be used as sources of the hydroxyl group: the 1-hydroxyalkylcarboranes such as 1-hydroxymethyl-carborane, 1-hydroxyethylcarborane, the 1-hydroxypropylcarboranes, the 1-hydroxybutylcarboranes and the like, the 1-hydroxyalkylneocarboranes such as 1-hydroxybutylneocarboranes, the 1-hydroxypentylneocarboranes, etc., the 1,2-bis-(1-hydroxyalkyl)carboranes such as 1,2-bis-hydroxymethylcarborane, 1,2-bis(1-hydroxyethyl)-carborane, the 1,2 - bis - (1-hydroxypropyl)carboranes, the 1,2-bis-(1-hydroxybutyl) carboranes, etc., as well as the bis-(hydroxyalkyl)neocarboranes. These include bis-(hydroxymethyl) neocarborane, bis(hydroxyethyl)neocarborane, the bis-(hydroxypropyl) - neocarboranes, the bis-(hydroxybutyl)neocarboranes among others. Also included within the scope of carborane alcohols and carborane diols are those carboranes having a free hydroxy function as well as other inert groups. For example, carboranes having an ether function as well as an alcohol or diol function can be used as the carborane reactant. Illustrative compounds of this type are: bis-(2-hydroxyethyl-1-carboranylmethyl) ether, bis-(2-hydroxymethyl-1-carboranylmethyl)ether and the corresponding neocarbanyl ethers. The favored carborane reactants are the bis(hydroxyalkyl)carboranes and bis(hydroxyalkyl)neocarboranes wherein the alkyl groups have 1–8 carbon atoms. Within this favored group the preferred reactants of this invention are the bis(hydroxyalkyl) carboranes wherein the alkyl group has from 1–8 carbon atoms. These reactants are preferred because the resultant products are polyesters with good resistance to ultraviolet attack.

Among the many dicarboxy or diester biscyclopentadienyl metallics that can be used as reactants are the following: the dicarboxylic acids of ferrocene (HOOC—$C_5H_4$—Fe—$H_4C_5$COOH)

the monoalkyl and dialkyl esters of these dicarboxyl acids such as:

$CH_3OOC$—$C_5H_4$—Fe—$H_4C_5$COOH and $C_2H_5OOC$—$C_5H_4$—Fe—$H_4C_5$—$COOC_2H_5$ the analogous ruthenium compositions, HOOC—$C_5H_4$—Ru—$H_4C_5$COOH and $CH_3OOC$—$C_5H_4$—RU—$H_4C_5$—COOH as well as the corresponding osmium biscyclopentadienyls. These include:

HOOC—$C_5H_4$—OS—$H_4C_5$—COOH
$C_3H_7OOC$—$C_5H_4$—OS—$H_4C_5$COOH
$C_4H_9$—OOC—$C_5H_5$—Os—$H_4C_5COOC_4H_9$ and the like.

Further latitude exists in the choice of reaction conditions such as the use of solvent, reaction temperatures, pressures, and times used to prepare the novel compounds of this invention. For example, the esterification ordinarily takes place in the presence of an inert solvent such as the aromatics. When such a solvent is used, i.e., benzene or toluene, the water or alcohol formed during esterification is taken off as the water-benzene azeotrope or as the alcohol-solvent mixture using an appropriate apparatus such as a Dean Starke trap. When the diesters are used as the biscyclopentadienyl reactants, a transesterification catalyst such as alkyl titanates, alkali metal carbonates, alkali metal borates as well as various lead, copper and magnesium salts can be used as catalysts as well as strong acids.

The temperature used in the esterification depends upon a number of factors including the reactants used, the process for removing the water or alcohol formed during esterification. An operable temperature range is 25–150° C. When solvents are used, the temperature range varies between 80–120° C., which is the reflux range of the solvents. The lower temperatures promote side reactions.

The reaction time being a function of the temperature and the reactants used varies between about 12 hours to about 72 hours with 24–60 hours being more typical.

Ordinarily, atmospheric or near atmospheric pressures are used during esterification. However, higher pressures can be used as desired.

When the monoesters or the diesters of the dicarboxy bis-cyclopentadienyl are used as reactants, the alcohol by-product is removed by distillation. Where the unesterified acids are used, the reaction vessel is fitted with a means of removing the water of esterification such as a Dean Starke condenser.

Ordinarily, the ratio of reactants is governed by the stoichiometry of the system. That is, when the carborane alcohols are used as reactants, at least 1 mole to 1.5 moles of biscyclopentadienyl reactant is used in the reaction. When the diols are reactants, from 2–3 moles of the biscyclopentadienyl reactant are used. However, as much as 50% increase or decrease in these ratios is not particularly harmful.

The isolation and purification procedures used are comparable to those used in monomer or polymer synthesis and for this reason are not discussed here. Details of specific techniques may be gleaned from the illustrative embodiments which follow:

In one embodiment, a mono-carboranyl ester is prepared by reacting 0.10 mole of ferrocene dicarboxylic acid (HOOC—D—Fe—D—COOH, where D=cyclopentadienyl)

and 0.1 mol of $HOCH_2\Theta H$ in the presence of a catalytic quantity of n-butyl titanate and 20 ml. of benzene in a reaction vessel equipped with a Dean Starke apparatus. The reaction mixture is refluxed for 40 hours. After 40 hours, the remaining solvent is stripped off and a viscous liquid is obtained as product. Infrared analysis indicated that the mono ester, $H\Theta CH_2OOCD$—Fe—DCOOH, is produced.

In a comparable embodiment, the above diester is produced by rerunning the same reactants using 2 moles of the $HOCH_2\Theta H$ reactant and one mole of the ferrocene dicarboxylic acid. Analytical data confirmed that the expected diester, $H\Theta CH_2OOCD$—Fe—$DCOOCH_2\Theta H$, is produced.

In a related embodiment, the carborane alcohol, $HO(CH_2)_2\Theta H$ (0.2 mole) is reacted with 0.1 mole of ferrocene dicarboxylic acid in the presence of a catalytic quantity of a lower alkyl titanate and 50 ml. of toluene. The reaction vessel is fitted with a Dean Starke apparatus. The reaction mixture is brought to reflux for 60 hours, then strippped of toluene. A product is obtained. Infrared analysis confirms that each of the two carboxyl groups on the ferrocene have been esterified producing the product of the formula:

$H\Theta(CH_2)_2OOCD$—Fe—$DCOO(CH_2)_2\Theta H$

In an analogous embodiment, the diester product, $H\Theta(CH_2)_6$—OOCD—Fe—$DCOO(CH_2)_6\Theta H$ is prepared by refluxing a reaction mixture of 0.2 mole of the reactant $HO(CH_2)_6\Theta H$ with 0.1 mole of ferrocene dicarboxylic acid, in 30 ml. of xylene in the presence of a catalytic quantity of butyl titanate, for 37 hours. After stripping off the solvent, the above shown diester is obtained.

In another embodiment, a dicarboranyl ester is prepared by reacting 0.10 mole of ferrocene dicarboxylic acid (HOOC—D—Fe—D—COOH, where D=cyclopentadienyl)

and 0.2 mole of $HO(CH_2)_4\Theta H$ in the presence of a catalytic quantity of n-butyl titanate and 20 ml. of benzene in a reaction vessel equipped with a Dean Starke apparatus. The reaction mixture is refluxed for 40 hours. After 40 hours, the remaining solvent is stripped off and a viscous liquid is obtained as product. Infrared analysis indicated that the diester, $H\Theta(CH_2)_4OOCD$—Fe—$DCOO(CH_2)_4\Theta H$ is produced.

In a comparable embodiment, the n-pentyl diester is produced by reacting 2 moles of $HO(CH_2)_5\Theta H$ reactant with one mole of the ferrocene dicarboxylic acid using the same solvent, reaction time and temperature. Analytical data confirmed that the expected diester, $$H\Theta(CH_2)_5OOCD—Fe—DCOO(CH_2)_5\Theta H$$

is produced.

In a related embodiment, the carborane alcohol, $$HO(CH_2)_8\Theta H$$

(0.2 mole) is reacted with 0.1 mole of ferrocene dicarboxylic acid in the presence of a catalytic quantity of a lower alkyl titanate and 50 ml. of toluene. The reaction vessel is fitted with a Dean Starke apparatus. The reaction mixture is brought to reflux for 60 hours, then stripped of toluene. A product is obtained. Infrared analysis confirms that each of the two carboxyl groups on the ferrocene have been esterified producing the product of the formula:

$$H\Theta(CH_2)_8OOCD—Fe—DCOO(CH_2)_8\Theta H$$

In an analogous embodiment, the diester product, $$H\Theta(CH_2)_7OOCD—Fe—DCOO(CH_2)_7\Theta H$$

is prepared by refluxing a reaction mixture of 0.2 mole of the reactant $HO(CH_2)_7\Theta H$ with 0.1 mole of ferrocene dicarboxylic acid, in 30 ml. of xylene in the presence of a catalytic quantity of butyl titanate, for 37 hours. After stripping off the solvent, the above shown diester is obtained.

In another embodiment, a polymer is obtained having recurring units of the formula:

$$\{O(CH_2)_6\Theta(CH_2)_6OOCD—Fe—DCO\}_n$$

This polymer is prepared as follows: equimolar portions of the carboranyl diol of the formula $$OH(CH_2)_6\Theta(CH_2)_6OH$$

and ferrocene dicarboxylic acid are heated together with excess toluene in the presence of a catalytic quantity of sulfuric acid at reflux temperatures in a reaction vessel fitted with a Dean Starke condenser. After 60 hours of refluxing, the reaction mixture is stripped off and the polymer isolated. Infrared analysis indicates esterification of the hydroxyl groups of the diol had taken place and viscosity measurements indicated the polymerization had taken place.

In another embodiment, a polymer is obtained having recurring units of the formula:

$$\{O(CH_2)_4\Theta(CH_2)_4OOCD—Fe—DCO\}_n$$

This polymer is prepared as follows: equimolar portions of the carboranyl diol of the formula $$HO(CH_2)_4\Theta(CH_2)_4OH$$

and ferrocene dicarboxylic acid are heated together with excess toluene in the prescence of a catalytic quantity of amyl titanate at reflux temperatures in a reaction vessel fitted with a Dean Starke condenser. After 48 hours of refluxing, the reaction mixture is stripped off and the polymer isolated. Infrared analysis indicates esterification of the hydroxyl groups of the diol had taken place and viscosity measurements indicated the polymerization had taken place.

In a further embodiment, the octyl homologue of the above polymer is obtained, having recurring units of the formula given below:

$$\{O(CH_2)_8\Theta(CH_2)_8OOCD—Fe—DCO\}_n$$

The preparation is as follows: equimolar portions of the carbonyl diol of the formula $$OH—(CH_2)_8—\Theta(CH_2)_8—OH$$

and ferrocene dicarboxylic acid are heated together with excess xylene in the presence of a catalytic amount of sulfuric acid. After 125 hours of refluxing in a reaction vessel fitted with a Dean Starke condenser. The reaction mixture is stripped of excess solvent and the above polymer isolated.

In another embodiment the mono ester, $$H\oplus—n—pentyl—OOCD—Fe—DCOOH$$

is prepared by reacting 0.1 mole of $HO—n—C_5H_{10}\oplus H$ and 0.1 mole of the ferrocene mono ester, $$C_2H_5OOCD—Fe—DCOOH$$

in 25 ml. of benzene in the presence of n-butyl titanate in a reaction vessel. The reaction mixture is refluxed for 35 hours, the reaction halted and the benzene and ethanol stripped off. A product having the afore-described formula is prepared. Analytical data confirms that the desired product has been produced.

In a related embodiment, the mono ester osmium composition, $H\Theta(CH_2)_4OOCD—Os—DCOOH$ is prepared by refluxing for 48 hours a reaction mixture of 0.2 mole of $H\Theta(CH_2)_4OH$, 0.2 mole of $HOOCR—Os—DCOOH$, 75 ml. of toluene and a catalytic quantity of n-butyl titanate. The reaction is halted and the solvent stripped off. A product having the above formula is obtained as confirmed by analytical data.

In another embodiment a polymer is obtained having recurring units of the formula:

$$\{OCH_2\Theta CH_2OOCD—Fe—DCO\}_n$$

This polymer is prepared as follows: equimolar portions of the carbonyl diol of the formula $$HO—CH_2—\Theta CH_2—OH$$

and ferrocene dicarboxylic acid are heated together with excess toluene in the presence of a catalytic quantity of p-toluene sulfonic acid at reflux temperatures in a reaction vessel fitted with a Dean Starke condenser. After 42 hours of refluxing, the reaction mixture is stripped off and the polymer isolated. Infrared analysis indicates esterification of the hydroxyl groups of the diol had taken place and viscosity measurements indicated the polymerization had taken place.

In a further embodiment, the ruthenium analogue of the above polymer is obtained, having recurring units of the formula given below:

$$\{OCH_2\Theta CH_2OOCD—Ru—D—CO\}_n$$

The preparation is as follows: equimolar portions of the carboranyl diol of the formula $$HO—(CH_2)_2—\Theta(CH)_2)_2—OH$$

and the ruthenium reactant, $$HOOC—D—Ru—D—COOH$$

and excess toluene are heated to reflux in the presence of butyl titanate catalyst for 38 hours. The reaction vessel contains a Dean Starke condenser to remove the water of esterification. At the end of the reaction time the residual toluene is removed and the polyester isolated.

Again, viscosity measurements and infrared analysis indicate the desired ruthenium polyester had been formed.

In a related embodiment, the corresponding ruthenium containing polyester is obtained as follows:

A 0.09 mole portion of $HOOH—D—Ru—D—COOH$ and a 0.09 mole portion of $HO—(CH_2)_2—\Theta(CH_2)_2OH$ is mixed with 100 ml. of toluene and a catalytic quantity of p-toluene sulphonic acid catalyst. The reaction mixture is refluxed for 48 hours during which time the water of esterification is taken off in a Dean Starke condenser. At the end of the reflux period, the reaction is halted and the solvent removed by distillation to yield the polymeric product. Elemental and infrared analysis indicate the expected ruthenium containing carborane polyester is produced. The polymer has recurring units of the structure:

$$\{O(CH_2)_2\Theta(CH_2)_2OOCD—Ru—D—CO\}_n$$

In a comparable embodiment, the neocarboranyl osmium analogue is prepared by refluxing for 50 hours equimolar quantities of HO—(CH$_2$)$_2$—⊕—(CH$_2$)$_2$—OH and dicarboxy biscyclopentadienyl osmium

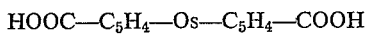
HOOC—C$_5$H$_4$—Os—C$_5$H$_4$—COOH

The same solvent and a catalytic quantity of p-toluene sulphonic are used.

Analytical evidence and infrared analysis indicate that the expected osmium containing polyester is prepared. This has recurring units of the structure:

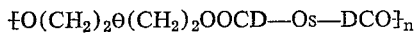
$\{O(CH_2)_2\oplus(CH_2)_2OOCD\text{—}Os\text{—}DCO\}_n$

In related embodiments, various corresponding neocarborane products are prepared. For instance, the mono ester, H⊕—n—C$_4$H$_9$—OOCD—Fe—DCOOH, is prepared by reacting 0.1 mole of HO—n—C$_4$H$_9$⊕H and 0.1 mole of the ferrocene mono ester,

C$_2$H$_5$OOCD—Fe—DCOOH in 25 ml. of benzene in the presence of n-butyl titanate in a reaction vessel. The reaction mixture is refluxed for 35 hours, the reaction halted and the benzene and ethanol stripped off. A product having the afore-described formula is prepared. Analytical data confirms that the desired product has been produced.

In a similar embodiment, the neocarborane mono ester (H⊕(CH$_2$)$_3$OOCD—Fe—DCOOH) is prepared by refluxing a reaction mixture of 0.2 mole of H⊕(CH$_2$)$_3$OH, 0.2 mole of HOOCD—Fe—DCOOH, 75 ml. of toluene and a catalytic quantity of n-butyl titanate for 48 hours. The reaction is halted and the solvent stripped off. A product having the above formula is obtained as confirmed by analytical data.

In another embodiment, a polymer is obtained having recurring units of the formula:

$\{OCH_2\oplus CH_2OOCD\text{—}Fe\text{—}DCO\}_n$

This polymer is prepared as follows: equimolar portions of the neocarboranyl diol of the formula

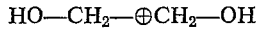
HO—CH$_2$—⊕CH$_2$—OH and ferrocene dicarboxylic acid are heated together with excess toluene in the presence of a catalytic quantity of amyl titanate at reflux temperatures in a reaction vessel fitted with a Dean Starke condenser. After 40 hours of refluxing, the reaction mixture is stripped off and the polymer isolated. Infrared analysis indicates esterification of the hydroxyl groups of the diol had taken place and viscosity measurements indicated the polymerization had taken place.

In a further embodiment, the ruthenium analogue of the above polymer is obtained, having recurring units of the formula given below:

$\{OCH_2\oplus CH_2OOCD\text{—}Ru\text{—}DCO\}_n$

The preparation is as follows: equimolar portions of the carboranyl diol of the formula

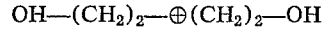
OH—(CH$_2$)$_2$—⊕(CH$_2$)$_2$—OH and the ruthenium reactant,

HOOC—D—Ru—D—COOH and excess toluene are heated to reflux in the presence of sulfuric acid catalyst for 48 hours. After esterification, the solvent is stripped off and the polyester isolated.

As indicated by the many embodiments given supra, numerous changes and modifications can be made in the inventive concept without departing from the spirit of this invention. The metes and bounds of this invention are best shown by the claims which follow.

We claim:
1. Monomeric and polymeric ester products of mono and dihydroxylated carboranes and metal biscyclopentadienyl reactants of the formula:

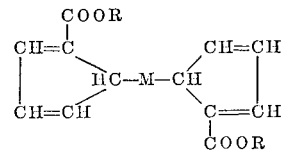

wherein R is selected from the group consisting of hydrogen and alkyl and M is a metal selected from the group consisting of iron, ruthenium and osmium.

2. Monomeric and polymeric ester products of mono and dihydroxylated carboranes and ferrocene reactants of the formula:

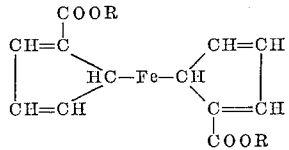

wherein R is selected from the group consisting of hydrogen and alkyl.

3. Monomeric and polymeric ester products of hydroxylated carboranes selected from the group consisting of carboranyl (Θ) alcohols and carboranyl (Θ) diols wherein Θ represents the ortho isomer of carborane and metal biscyclopentadienyl reactants of the formula:

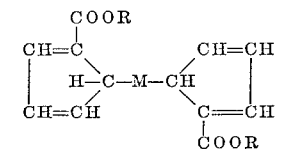

wherein R is selected from the group consisting of alkyl and hydrogen and M is a metal selected from the group consisting of iron, ruthenium and osmium.

4. Monomeric and polymeric ester products of mono and dihydroxylated carboranes selected from the group consisting of carboranyl (Θ) alcohols wherein Θ represents the ortho isomer of carborane and hydroxy alkylcarboranes and ferrocene reactants of the formula:

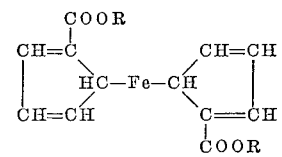

wherein R is selected from the group consisting of alkyl and hydrogen.

5. Monomeric and polymeric ester products of mono and dihydroxylated carboranes selected from the group consisting of neocarboranyl (⊕) alcohols and ferrocene reactants of the formula:

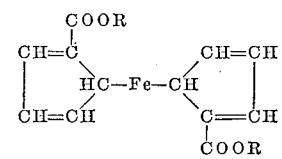

wherein R is selected from the group consisting of hydrogen and alkyl.

6. Polyester products having recurring units of the formula:

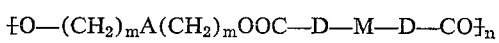
$\{O\text{—}(CH_2)_mA(CH_2)_mOOC\text{—}D\text{—}M\text{—}D\text{—}CO\}_n$ wherein A is the generic term for the three isomeric radicals of the carborane isomers, D is the disubstituted cyclopentadienyl radical, and M is a metal selected from the group consisting of iron, ruthenium and osmium, $m$ is an integer from 1 to 8 and $n$ represents the number of units formed in polymerizing monomeric esters to said polyester products under polymerizing conditions for a period sufficient for said polyester products to form.

7. Polyester products having recurring units of the formula:

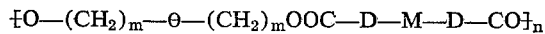

wherein Θ is the radical of the ortho isomer of carborane, D is the disubstituted cyclopentadienyl radical, M is a metal selected from the group consisting of iron, ruthenium and osmium, $m$ is an integer from 1 to 8 and $n$ represents the number of units formed in polymerizing monomeric esters to said polyester products under polymerizing conditions for a period sufficient for said polyester products to form.

8. Polyester products having recurring units of the formula:

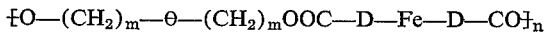

wherein Θ is the radical of the ortho isomer of carborane, D is the disubstituted cyclopentadienyl radical, $m$ is an integer from 1 to 8 and $n$ represents the number of units formed in polymerizing monomeric esters to said polyester products under polymerizing conditions for a period sufficient for said polyester products to form.

9. Polyester products having recurring units of the formula:

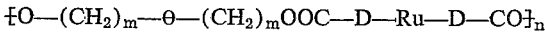

wherein Θ is the radical of the ortho isomer of carborane, D is the disubstituted cyclopentadienyl radical, $m$ is an integer from 1 to 8 and $n$ represents the number of units formed in polymerizing monomeric esters to said polyester products under polymerizing conditions for a period sufficient for said polyester products to form.

10. Polyester products having recurring units of the formula:

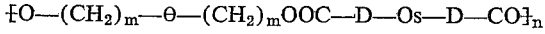

wherein Θ is the radical of the ortho isomer of carborane, D is the disubstituted cyclopentadienyl radical, $m$ is an integer from 1 to 8 and $n$ represents the number of units formed in polymerizing monomeric esters to said polyester products under polymerizing conditions for a period sufficient for said polyester products to form.

11. Polyester products having recurring units of the formula:

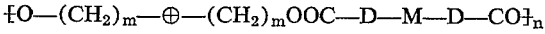

wherein ⊕ is the radical of the meta isomer of carborane, D is the disubstituted cyclopentadienyl radical, M is a metal selected from the group consisting of iron, ruthenium and osmium, $m$ is an integer from 1 to 8 and $n$ represents the number of units formed in polymerizing monomeric esters to said polyester products under polymerizing conditions for a period sufficient for said polyester products to form.

12. Polyester products having recurring units of the formula:

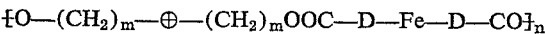

wherein ⊕ is the radical of the meta isomer of carborane, D is the disubstituted cyclopentadienyl radical, $m$ is an integer from 1 to 8 and $n$ represents the number of units formed in polymerizing monomeric esters to said polyester products under polymerizing conditions for a period sufficient for said polyester products to form.

13. Polyester products having recurring units of the formula:

wherein Θ is the radical of the ortho isomer of carborane, D is the disubstituted cyclopentadienyl radical, and $n$ is an integer which represents the number of units formed in polymerizing monomeric esters to said polyester products under polymerizing conditions for a period sufficient for said polyester products to form.

14. Polyester products having recurring units of the formula:

wherein Θ is the radical of the ortho isomer of carborane, D is the disubstituted cyclopentadienyl radical, and $n$ is an integer which represents the number of units formed in polymerizing monomeric esters to said polyester products under polymerizing conditions for a period sufficient for said polyester products to form.

15. Polyester products having recurring units of the formula:

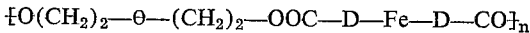

wherein Θ is the radical of the ortho isomer of carborane, D is the disubstituted cyclopentadienyl radical, and $n$ is an integer which represents the number of units formed in polymerizing monomeric esters to said polyester products under polymerizing conditions for a period sufficient for said polyester products to form.

16. Polyester products having recurring units of the formula:

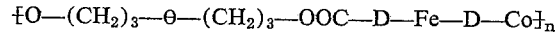

wherein Θ is the radical of the ortho isomer of carborane, D is the disubstituted cyclopentadienyl radical, and $n$ is an integer which represents the number of units formed in polymerizing monomeric esters to said polyester products under polymerizing conditions for a period sufficient for said polyester products to form.

17. Polyester products having recurring units of the formula:

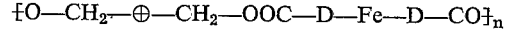

wherein ⊕ is the radical of the meta (neocarboranyl) of carborane, D is the disubstituted cyclopentadienyl radical, and $n$ is an integer which represents the number of units formed in polymerizing monomeric esters to said polyester products under polymerizing conditions for a period sufficient for said polyester products to form.

18. Polyester products having recurring units of the formula:

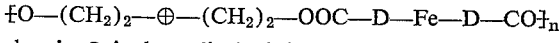

wherein ⊕ is the radical of the meta (neocarboranyl) of carborane, D is the disubstituted cyclopentadienyl radical, and $n$ is an integer which represents the number of units formed in polymerizing monomeric esters to said polyester products under polymerizing conditions for a period sufficient for said polyester products to form.

19. Polyester products having recurring units of the formula:

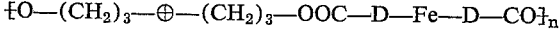

wherein ⊕ is the radical of the meta (neocarboranyl) of carborane, D is the disubstituted cyclopentadienyl radical, and $n$ is an integer which represents the number of units formed in polymerizing monomeric esters to said polyester products under polymerizing conditions for a period sufficient for said polyester products to form.

20. Ester products included within the formula:

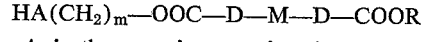

wherein A is the generic term for the three isometric radicals of carborane, D is a disubstituted cyclopentadienyl radical $C_5H_4$—, M is a metal selected from the group consisting of a metal selected from the group consisting of iron, ruthenium and osmium, and $m$ is an integer from 1 to 8, and R is selected from the group consisting of hydrogen, alkyl and $HA(CH_2)_m$, wherein $m$ is the same as defined above.

21. Ester products included within the formula:

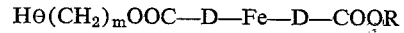

wherein Θ is the ortho carborane isomer, D is a disubstituted cyclopentadienyl radical $C_5H_4$, $m$ is an integer ranging between 1 and 4, and R is selected from the group consisting of hydrogen, alkyl and $H\Theta(CH_2)_m$ wherein $m$ is the same as defined above.

22. An ester product of the formula:

$$H\Theta CH_2OOC-D-Fe-COOCH_2\Theta H$$

wherein $\Theta$ is the ortho carborane isomer and D is the disubstituted cyclopentadienyl radical $C_5H_4$.

23. An ester product of the formula:

$$H\Theta(CH_2)_2OOC-D-Fe-DCOO(CH_2)_2\Theta H$$

wherein $\Theta$ is the ortho carborane isomer and D is the disubstituted cyclopentadienyl radical $C_5H_4$.

24. An ester product of the formula:

$$H\Theta(CH_2)_4OOC-D-Fe-D-COO(CH_2)_4\Theta H$$

wherein $\Theta$ is the ortho carborane isomer and D is the disubstituted cyclopentadienyl radical $C_5H_4$.

25. An ester product of the formula:

$$H\Theta(CH_2)_5OOC-D-Fe-D-COO(CH_2)_5\Theta H$$

wherein $\Theta$ is the ortho carborane isomer and D is the disubstituted cyclopentadienyl radical $C_5H_4$.

26. An ester product of the formula:

$$H\oplus-n-pentyl-OOC-D-Fe-D-COOH$$

wherein $\oplus$ is the meta carborane isomer and D is the disubstituted cyclopentadienyl radical $C_5H_4$.

27. An ester product of the formula:

$$H\oplus(CH_2)_3OOC-D-Fe-D-COOH$$

wherein $\oplus$ is the meta carborane isomer and D is the disubstituted cyclopentadienyl radical $C_5H_4$.

28. An ester product of the formula:

$$H\oplus(CH_2)_3OOC-D-Fe-D-COO(CH_2)_3\oplus H$$

wherein $\oplus$ is the meta carborane isomer and D is the disubstituted cyclopentadienyl radical $C_5H_4$.

29. An ester product of the formula:

$$H\Theta(CH_2)_4OOC-D-O_S-D-COOH$$

wherein $\Theta$ is the meta carborane isomer and D is the disubstituted cyclopentadienyl radical $C_5H_4$.

30. An ester product of the formula:

$$H\Theta-n-C_4H_9-OOC-D-Fe-D-COOH$$

wherein $\Theta$ is the meta carborane isomer and D is the disubstituted cyclopentadienyl radical $C_5H_4$.

31. A process for preparing a biscyclopentadienyl-metal carborane polyester having recurring units of the formula $$\{O-(CH_2)_mA(CH_2)_mOOC-D-M-D-CO\}_n$$

wherein A is the generic term for the three isomeric radicals of the carborane isomers, D is the disubstituted cyclopentadienyl radical $-C_5H_4-$, M is a metal selected from the group consisting of iron, ruthenium and osmium, and $n$ is an integer which in the case of the $-(CH_2)-$ radical is 1 to 8 and which in the case of the recurring units represents the number of units formed in polymerizing the following reactants under the conditions defined below, said process comprising reacting equimolar portions of a carboranyl (A) diol wherein A is the same as defined above and a metallocene reactant of the formula:

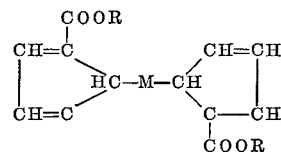

wherein M is the same as defined above and R is selected from the group consisting of hydrogen and alkyl radicals having from 1 to 4 carbon atoms in a hydrocarbon solvent having a boiling point in the range of about 80–120° C. at reflux temperature in the presence of a catalytic amount of a catalyst selected from the group consisting of sulfuric acid and p-toluene sulfonic acid for a period of time at least sufficient for said carborane polyester to form.

32. The process of claim 31 wherein the carboranyl (A) diol is an ortho isomer of carborane.

33. The process of claim 31 wherein the carboranyl (A) diol is a neocarboranyl diol.

34. The process of claim 31 wherein the metal is iron.

35. The process of claim 31 wherein the metal is ruthenium.

36. The process of claim 31 wherein the metal is osmium.

37. The process of claim 31 wherein the reaction period is from about 38 to about 125 hours.

38. The process of claim 31 wherein the catalyst is sulfuric acid.

39. The process of claim 31 wherein the catalyst is p-toluene sulfonic acid.

References Cited

UNITED STATES PATENTS 3,290,357  12/1966  Fein et al. _____ 260—487

OTHER REFERENCES

Onak: Advances in Organometallic Chemistry, vol. 3, Academic Press, New York, N.Y., 1965, p. 333.

HELEN M. McCARTHY, *Primary Examiner.*
ARTHUR P. DEMERS, *Assistant Examiner.*